United States Patent Office 2,694,646
Patented Nov. 16, 1954

2,694,646

ZIRCONIA COMPOSITIONS

Harold C. Wagner, East Cleveland, and Robert A. Schoenlaub, Cleveland, Ohio, assignors, by mesne assignments, to Zirconium Corporation of America, Cleveland, Ohio, a corporation of Ohio No Drawing. Application July 19, 1949,
Serial No. 105,666

4 Claims. (Cl. 106—57)

Zirconium oxide has a very high melting point and certain advantageous properties for application in high temperature conditions, but unfortunately it has a coefficient of thermal expansion and a low thermal conductivity, rendering it susceptible to spalling, and like ceramic bodies generally, it is brittle. For many usages, there are desired certain properties which are not common to ceramic materials and in fact are antagonistic to the intrinsic characteristics of zirconia. In accordance with the present invention however, it now becomes possible to modify zirconia such as to have much of the strength and shock resistance of metal, while being of very high melting point, and also presenting a non-wetting surface. Other objects and advantages of the present invention will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

We have found that zirconia can be modified with increase of strength and shock resistance, while retaining high refractoriness, by incorporating with zirconia certain metal components. Metals are very difficult to obtain to requisite grain size, and also tend to be sensitive to forming water. We accordingly generally prefer to incorporate with the zirconia, metal compounds rather than powdered metal, as it is thereby possible to attain greater uniformity and easier preparation. The metals which we find most useful are nickel and copper, although nickel and iron, nickel-chromium and iron, Monel, etc., may be used. In other words, the metals involved are those of atomic number 24–29 whose boiling point is over 2000° C. A combination thus of such metals and zirconia results in material which can withstand very high temperatures and which has a strength and shock resistance of an unexpected character. A plurality of the aforesaid metal constituents may be employed, or one dependent upon results desired. Combinations with an iron constituent are easy to make, and for some applications are quite satisfactory. The most useful metals oxidize more slowly than iron and are easier to reduce. The metal oxides or compounds employed must be uniform and in a fine state of subdivision. A particle size of less than 5 microns, and preferably less than one micron, e. g. ½ micron is desired. The physical properties of the body improve with the density of the fired body. A final high density can be obtained by fine metal constituents. However, the metal constituents may be coarser and less uniform if a plasticizer or a higher forming pressure is used. The oxides of the afore-mentioned metals are particularly preferred. In some cases, the carbonates, sulphates, hydroxides, etc., may be used, but these have an undesirable volume change during reduction, and correspondingly are not fully equivalent to the oxides. With the zirconia in grain size of 5–80 microns preferably, although in some instances coarser or finer material can be used, and the aforesaid metal oxide in fineness as above mentioned, the molding is relatively simple, not requiring high pressures, and the composition may be formed into shape by pressing, extrusion, slip-casting, etc., as in common procedures. The firing temperatures are generally those usual in ceramic technology. Zirconium silicate, calcium zirconate, fine clay, etc., may be included with the zirconia in small amounts for some usages, but the refractoriness and non-wetting characteristics are to that extent lessened.

Usually the refractoriness and non-wetting characteristics are greater for the larger proportions of zirconia component in the composition, while the strength and shock resistance are greater for the larger proportions of the metal component. In general, the composition is formed of zirconium oxide in amount 25 to 80 percent, and a metal component 20 to 75 percent, by weight. This corresponds to a metallic component volume of about 12 to 55 percent, porosity not being considered. Usually it is desirable that both phases be contiguous, that is, that adjacent oxide grains be in contact with each other, and also the matrix metal component be continuous. Where the service conditions to which the composition is exposed involve temperatures above the melting point of the metal there may be even a volatilization of the metal without changing the zirconia structure. In service such as in ladles below the melting point of the metal, the composition proportions may be such that the metallic component phase may be continuous and the zirconia phase more or less discontinuous.

The temperature of firing the composition as formed into desired shapes is usually lower than those which have been utilized in the known practice with aluminum oxide and chromium metal. A temperature of firing depends somewhat upon the particular composition and the degree of compaction, and the ultimate use. If a tough but soft body is required, a firing temperature in order of 1800–2300° F. is satisfactory. Compositions on this order make excellent coatings for metal parts. Also, lightly fired porous bodies are usually more shock resistant than heavy dense bodies. If a harder and more dense body is desired, the firing temperatures may be on the order of 2400–3000° F.

For such usage as ladles or furnace parts for molten aluminum, extreme refractoriness and spalling resistance are not so important, but strength and a non-wetting surface is important. Such a body, particularly in ladle service is exposed to oxidation, and iron should not be a major part of the metallic constituent phase. A proportion of about 50 percent of stabilized zirconia with the equivalent of 50 percent nickel by weight, i. e. about 40 percent by volume is satisfactory. The nickel component here should be in the form of nickel oxide and less than one micron size. Such mixture may be hand molded in a plaster mold, dried, and fired to about 2800° F. in a reducing atmosphere. In service, the surface remains non-wetting. Nickel lost to the metal handled is so small in relation to the metal that it is negligible.

For such usages as rocket nozzles, high refractoriness and resistance to a single but very great thermal shock, together with moderate strength is required. A satisfactory mixture for this is about 75 percent of stabilized zirconia and 25 percent metal equivalent in the form of very fine oxide. The metal may be nickel, or since no extended life is required, iron or mixtures thereof. This can be obtained as a metal oxide powder of less than one micron particle size. Such a mixture should be commingled very thoroughly, a small amount of a binder such as a gum arabic solution may be admixed in and the material may be pressed to desired form, and be fired to about 2500° F. in a reducing atmosphere. With a firing temperature 200 or 300° F. lower, or a slightly higher proportion of the metal component, the product will have a still lower cracking tendency in service. The metal equivalent may be reduced to around 20 percent in some cases. For higher resistance against oxidation, iron may be replaced in part by nickel.

Valve discs used in hand facing exhaust valves for heavy duty internal combustion engines are exposed to particularly severe service. Such discs are alternately heated with an acetylene flame and cooled by an air blast. They must have high refractoriness, high spalling resistance, but they do not require particularly high strength. A composition of about 60 percent of stabilized zirconium oxide and 40 percent of nickel equivalent, by weight, is in general satisfactory.

For nozzles for teeming steel, similar mixtures as for rocket nozzles may be used. Iron, however, is undesirable as the major part of the metal component here, and the nozzles should be fired at a temperature well above customary teeming temperatures.

For usages involving coating on metal articles, as above-mentioned, it is satisfactory to mix the composition of zirconia and metal component, in proportion for instance of about 70 percent zirconia to 30 percent metal component equivalent, in a synthetic organic varnish, and this suspension can then be sprayed, painted, or applied by dipping, on the metal part to be coated, such as cleaned iron or steel. After drying, the coated article is fired to temperatures just short of the melting temperature of the coated metal. For such usages, copper is particularly easy to use and is satisfactory in many conditions, but nickel or mixtures can also be used.

In some instances, chromium alloys are desirable instead of nickel and so forth as above-mentioned. Metallic chromium or stainless steel however, is not available in a requisite grain size, and the reducing and normalizing of oxide mixtures is troublesome. Chromium differs somewhat from the other mentioned metals in that in the oxide form it tends to react with zirconia and form a chromate. This, however, gives a very strong homogeneous bonded material which is useful for such situations as gas turbine blades. The surface containing the chromium or zirconium chromate would not be reduced or otherwise effected by any atmosphere to which it would be subjected in this kind of usage.

Examples of detailed procedure in accordance with the invention are.

I. Zirconia in particle size of 5 to 60 microns, with an average of 20 microns, is mixed in the proportion of about 75 percent with the equivalent of 25 percent iron, by weight. The iron is in the form of a —1 micron pigment grade of ferric oxide, and for the equivalent of 25 percent iron, this requires about 42.5 parts of the ferric oxide. For molding, about 7 parts of water containing about one part of a binder such as starch is thoroughly mixed in. A solubilized starch is particularly desirable, for example the commercial product "Cere-amic Flour." The mixture is pressed in a die to shape the material into a desired article, for instance a rocket nozzle, and a pressure of at least one ton per square inch is desirable. The formed article is fired in an atmosphere containing free hydrogen to about 2500° F. Nickel may be substituted for the iron in any proportion.

II. About 60 parts of zirconium oxide and 51 parts of a —1 micron nickelous oxide, and about one part of gum arabic in 10 parts of water, are thoroughly mixed, and the mixture is pressed in a die to form for instance a valve disc, and after drying is fired to about 2000° F. in an atmosphere containing carbon monoxide.

III. About 50 parts of stabilized zirconia and 63 parts of micron sized nickelous oxide, and about ½ part of gum arabic and ½ part of soluble starch as above-mentioned, in about 15 parts of water are thoroughly mixed to molding consistency. The mixture is shaped in a plaster mold to form for instance a ladle. The ladle is dried, and is fired to about 2600° F. in loosely packed graphite. If a suitable lug be provided in the shaped ladle, this may be drilled and a handle extension may be bolted on.

In addition to such articles as mentioned, the composition may also be formed into pump parts, baffles, pyrometer tubes, etc., i. e. articles generally for usage in high temperatures and where resistance to heat shock and slag and glasses is desired.

Other modes of applying the principle of the invention may be employed, change being made as regards the details described, provided the features stated in any of the following claims or the equivalent of such be employed.

We therefore particularly point out and distinctly claim as our invention:

1. A composition of matter formed of a mixture of metal oxides fired in reducing conditions consisting essentially of oxide of zirconium 25–80 percent, and at least one oxide of metal in the atomic number range 24–29 of boiling point over 2000° C., selected from the members chromium, iron, nickel and copper, oxide of nickel being present in every case.

2. A composition of matter formed of a mixture fired in reducing conditions of zirconium oxide in amount 25–80 percent, and nickel oxide 20–75 percent.

3. A composition of matter formed of a mixture fired in reducing conditions of zirconium oxide 25–80 percent, and copper oxide 20–75 percent.

4. A composition of matter according to claim 2 in which the zirconium oxide is in greater proportion than the nickel oxide.

References Cited in the file of this patent

UNITED STATES PATENTS

| Number | Name | Date |
|---|---|---|
| 1,362,317 | Hutchins | Dec. 14, 1920 |
| 2,231,944 | Pole | Feb. 18, 1941 |
| 2,271,368 | Fulcher et al. | Jan. 27, 1942 |
| 2,294,756 | Inutsuka et al. | Sept. 1, 1942 |
| 2,297,546 | Field | Sept. 29, 1942 |
| 2,431,660 | Gaudenzi | Nov. 25, 1947 |

OTHER REFERENCES

"Metal Industry," May 14, 1948, pages 405–7.